April 25, 1961   J. K. FAIRBAIRN   2,981,078
HUMIDITY CONTROL AND COOLING SYSTEM
Filed July 7, 1958
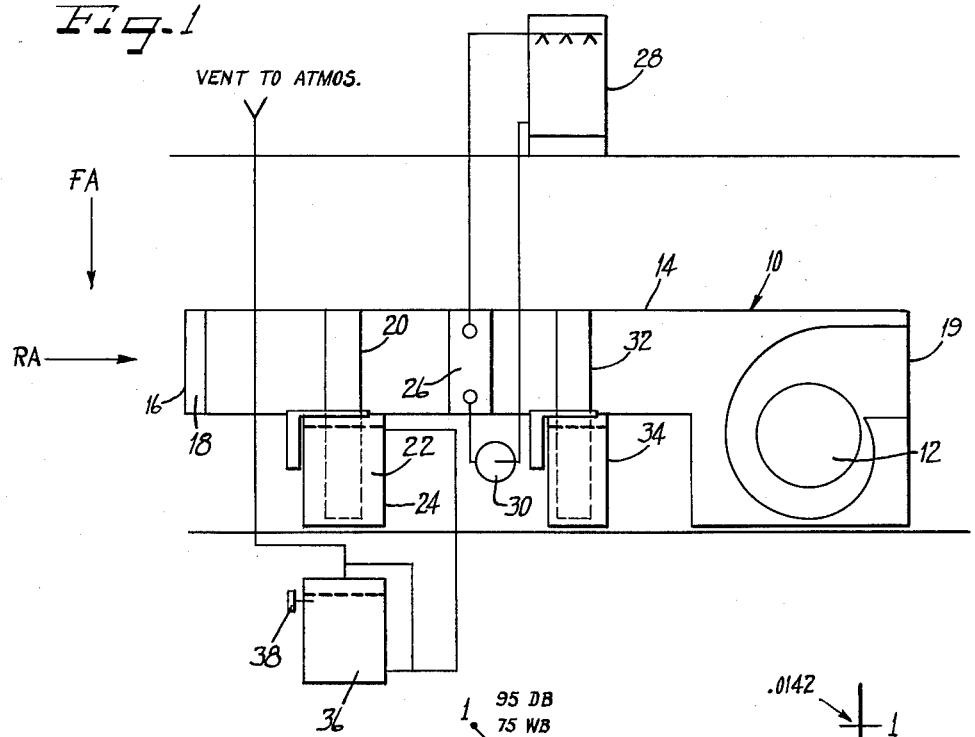
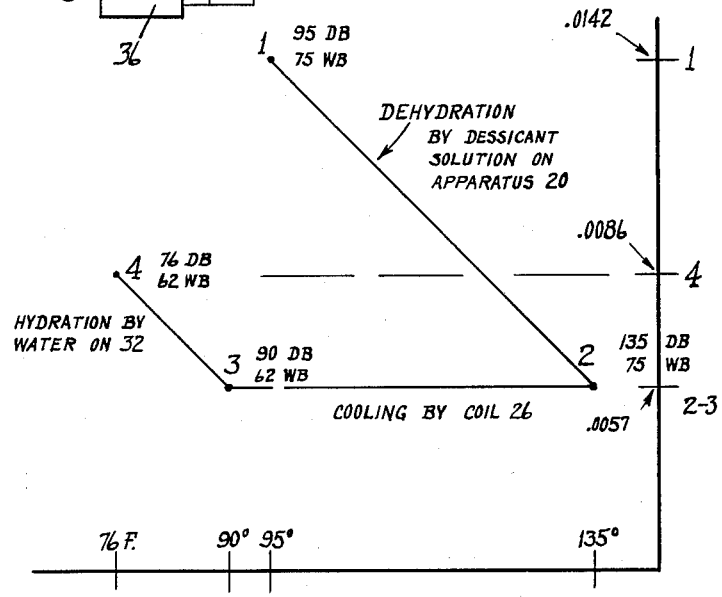
Inventor
John K. Fairbairn

# United States Patent Office 2,981,078
Patented Apr. 25, 1961

2,981,078
HUMIDITY CONTROL AND COOLING SYSTEM
John K. Fairbairn, 1011 Crain St., Evanston, Ill.
Filed July 7, 1958, Ser. No. 746,838
1 Claim. (Cl. 62—271)

This invention relates to a humidity control and cooling system, and more particularly to a system which is adapted to bring the air in an enclosed space to a desired temperature and relative humidity with very little power input.

Heretofore, various humidity control devices have been available using desiccants, sprays, and the like, but none of these systems has been adapted to afford an accurately calibrated humidity and temperature control system at low power input. The invention utilizes a liquid desiccant acting through a foraminous disk rotated partially therein to provide such a system, in combination with a cooling means including a water tower or the like, rehumidifying means such as a water spray or disc and means for reconditioning the desiccant solution, in predetermined sequence such that relatively high temperature air at a given humidity can be brought to a much lower temperature and a desired humidity.

Accordingly, it is an object of the present invention to provide an air conditioning system which utilizes a liquid desiccant and rehumidifying means in combination to afford a highly efficient and economical humidity and cooling control.

Another object of the invention is to provide a system and method wherein moisture is removed from a mixture of fresh and return air by a hygroscopic agent, and the resultant heat of condensation is controlled by passing the air through a cooling means including in combination therewith a cooling coil, rehumidifying means being thereupon utilized to evaporate the water into the air stream and to achieve a desired relative humidity.

Another object of the invention is to provide a system and method as described wherein the hygroscopic means is regenerated by boiler means adapted to dissipate the water collected.

Another object of the invention is to provide a system and means as described in which continuous, accurate control is afforded in a compact, economical form for efficient operation in a wide variety of applications.

Further objects and advantages of the invention will become apparent as the description proceeds in accordance with the drawings, in which:

Figure 1 is a schematic showing of a cooling and humidity control system according to the present invention; and Figure 2 is a diagrammatic representation of a cooling cycle accomplished by the apparatus of Figure 1.

Referring now to Figure 1, the invention includes a cooling system and humidity control apparatus 10 comprising a fan or blower 12 adapted to afford a continuous pressure head in a conduit 14, the conduit having an inlet 16 in which a plurality of filters 18 are disposed. Return and fresh air in a preferred proportion of 10% fresh air to 90% return air is introduced through the inlet 16 and moved continuously through the conduit 14 to an outlet 19 by the fan 12. A foraminous disk 20, which may be of a type manufactured by the Farr Company utilizing a bronze screen rotor which is gear motor driven and adapted to afford an evenly wetted surface, is journalled in the system so that its lower half is immersed in a hygroscopic solution 22 contained in a tank 24, the solution being preferably triethylene glycol which, in addition to having the property of picking up moisture from the air, has a certain therapeutic value when atomized into a housing space. This latter characteristic, however, is well known and forms no part of the present invention and it will be appreciated that other solutions could be used within the understanding of those skilled in the art. From the rotor or disk 20 the air is drawn into association with a plurality of cooling coils 26 utilizing water from a cooling tower 28, a suitable pump 30 being provided for this purpose so that the heat of condensation remaining in the air after its passage from the hygroscopic means 20–24 is reduced. This increment of heat results from the fact that the relative humidity drops as the absolute humidity drops and the dry bulb temperature rises correspondingly. The heat absorbed by the coils 26 is conveyed to the cooling tower 28 and is thereupon dissipated to atmosphere by evaporation. Thus the absolute humidity of the air remains constant as it passes these coils, while the dry bulb and wet bulb temperatures fall and the relative humidity rises. The cooling tower 28 may be of a type such as is manufactured by the Bloomer Heating and Ventilating Company of Chicago, having an open, gravity type water distribution means at the top of the tower and a plurality of red wood or treated fir filter elements disposed in stacked relationship, in association with a suitable fan.

In order to achieve a desired temperature and humidity condition, the air is then drawn into association with a humidifier 32, which may take the form of a disk corresponding to the disk 20 and rotatably immersed for approximately half its diameter in a water tank 34, so that the relative humidity is increased to a selected point as the absolute humidity is raised and the dry bulb temperature falls. Alternatively, a water spray rehumidifying means could be used, and in either case, suitable humidistat means (not shown) are provided for this purpose. The conditioned air is thereupon passed through the outlet 19 and the cycle continued.

In order to regenerate the desiccant or hygroscopic agent 22, a boiler 36 is provided which is adapted to receive water from the wheel or disk 20 and boil it off into atmosphere. A suitable control 38 is connected with the boiler means 36, which, for example, may be set to provide a temperature of approximately 225° F. in accordance with the expected volume of water to be dissipated.

In one example of the operation of the device, the air entering the inlet 16 might comprise 10% of fresh air at 95° F. dry bulb and 78° F. wet bulb temperature with .0165 pound of water per pound of air, and 90% of return air at 85° F. dry bulb and 69° F. wet bulb temperatures with .0115 pound of water per pound of air. The mixture thus afforded would have a dry bulb temperature of 86° F., a wet bulb temperature of 69.9° F. and .012 pound of water per pound of air, or 45% relative humidity and 34.2% total humidity. After passing through the hygroscopic means 20–24, the air will have a dry bulb temperature of 125° F. and a wet bulb temperature of 69.9° F. with .003 pound of water per pound of air, or 5% relative humidity and 34.2% total humidity. The water in the cooling coils 26 may be, for example, at a temperature of 86° F., and as the air is passed therethrough a 90° dry bulb temperature and 57° wet bulb temperature, with .003 pound of water per pound of air or 10% relative humidity, and 25% total humidity is achieved. Thereupon the air is passed into contact with the cooling and rehumidifying means 32 and the controls may be set so that the air attains a dry bulb temperature of 70° F., a wet bulb temperature of 57° F. and .0073 pound of water per pound of air or a 45% relative humidity and 25% absolute humidity. The cooling means 32 may provide water at 85° F. dry bulb temperature and 75° F. wet bulb temperature for this purpose.

In another example, indicated diagrammatically in Figure 2, air is introduced into the system having .0142 pound of water per pound of air, which is reduced by the hygroscopic means to .0057 pound of water per pound of air, the dry bulb temperature being raised from 95° F. to 135° F. as it passes through the wheel 20. When the heated air passes over the cooling coils 26, the dry bulb temperature is reduced to 90° F. and the wet bulb temperature to 62° F. As water is evaporated into the air by the means 32 (which may be a spray as hereinbefore indicated), the dry bulb temperature is reduced to 76° F. while the wet bulb temperature is kept at substantially 62° F.

The disk 20, cooling coils 26, tower 28 and boiler 36 of the system will generally not be used during winter months, when humidification only is desired. At this time, the means 32 may be operated independently, so that an exceptionally versatile and economical system is afforded.

Although I have herein set forth and described my invention with respect to certain specific principles and details thereof, it will be understood by those skilled in the art that these may be varied without departing from the spirit and scope of the invention as set forth in the hereunto appended claim.

I claim as my invention:

A humidity control and cooling system comprising in combination a conduit having an inlet and an outlet, a first foraminous wheel rotatably mounted partially within said conduit and adjacent said inlet, means holding hygroscopic solution, said wheel extending partially into said hygroscopic solution, boiler means connected to said means holding hygroscopic solution to regenerate the solution and dissipate water collected by said foraminous wheel, a cooling coil in said conduit on the side of said wheel opposite said inlet for serially treating air dehumidified by said wheel to remove heat of condensation therefrom, a water tower connected to said cooling coil, a second foraminous wheel extending partially into said conduit on the other side of said cooling coil from said first foraminous wheel, means partially immersing said second wheel in water to serially rehumidify air passing from said first wheel and said cooling coil and blower means in said conduit for forcing air through said conduit from said inlet to said outlet, said conduit passing the air serially past said first wheel, said cooling coil and said second wheel for successive treatment thereof.

References Cited in the file of this patent

UNITED STATES PATENTS

| | | |
|---|---|---|
| 2,063,960 | Smith | Dec. 15, 1936 |
| 2,133,334 | Rosett | Oct. 18, 1938 |
| 2,147,248 | Fleisher | Feb. 14, 1939 |
| 2,152,251 | Gay | Mar. 28, 1939 |
| 2,159,276 | Lawless | May 23, 1939 |
| 2,177,869 | Crawford | Oct. 31, 1939 |
| 2,256,940 | Crawford | Sept. 23, 1941 |
| 2,464,766 | Pennington | Mar. 15, 1949 |
| 2,723,837 | Pennington | Nov. 15, 1955 |